United States Patent [19]

Lange

[11] Patent Number: 4,993,773
[45] Date of Patent: Feb. 19, 1991

[54] VEHICLE WITH PIVOTAL COVER PANEL
[75] Inventor: Jack Lange, Winnipeg, Canada
[73] Assignee: Expandable Van Tops Ltd., Winnipeg, Canada
[21] Appl. No.: 440,486
[22] Filed: Nov. 24, 1989

Related U.S. Application Data

[63] Continuation of Ser. No. 207,489, Jun. 16, 1988, abandoned.
[51] Int. Cl.$^5$ .............................................. B60P 3/32
[52] U.S. Cl. ..................................... 296/160; 296/165; 296/166; 296/174; 296/176; 135/88; 49/248; 16/370
[58] Field of Search ......... 296/156, 159, 160, 164–166, 296/169, 174, 176; 135/88; 49/246, 248; 16/368–370

[56] References Cited

U.S. PATENT DOCUMENTS

| | | | |
|---|---|---|---|
| 1,256,144 | 2/1918 | Lewis | 16/368 |
| 2,206,708 | 8/1938 | Stumpf | 16/358 |
| 3,489,452 | 9/1967 | Plante | 296/161 |
| 3,917,337 | 11/1975 | Couix | 296/169 |
| 4,462,631 | 7/1984 | Lange | 296/160 |

Primary Examiner—Dennis H. Pedder
Attorney, Agent, or Firm—Adrian D. Battison; Stanley G. Ade; Murray E. Thrift

[57] ABSTRACT

A vehicle used for camping or the like includes a roof structure having an opening upon which is mounted a seperable cover panel. The cover panel can be moved from a closed position covering the opening to an open position in which it is suspended in cantilever arrangement outwardly from one side of the opening with a tent enclosure between the opening and the underside of the panel to cover an access area therebetween. A lever arrangement includes first and second levers which are connected for pivotal movement respectively at the side edge of the opening and the adjacent side edge of the panel. Third and fourth levers are connected each coupled to one of the first and second levers for pivotal movement with the third and fourth levers connected together between the first and second levers and exending outwardly therefrom to engage a cable. The cable leads from the outer edge of the roof opening to the outer edge of the cover panel so that the cable supports the cover panel in cantilever arrangement and holds the third and fourth levers in a direction to force apart the first and second levers so that the first and second levers pivotally couple the panel on the roof without the necessity for a direct hinge coupling.

13 Claims, 3 Drawing Sheets

VEHICLE WITH PIVOTAL COVER PANEL

This application is a continuation, of application Ser. No. 207,489, filed June 16, 1988, abandoned.

BACKGROUND OF THE INVENTION

This invention relates to a recreational vehicle or camper with a pivotal cover panel of a type which in a normal closed position thereof lies over a substantially rectangular opening in the roof of the vehicle and can be moved by pivotal movement from the closed position to an open position in which the cover panel is inverted and extends outwardly to one side of the vehicle from one side edge of the opening. An enclosure member including a flexible cover fabric is secured by lower edges of the fabric to the vehicle at the opening and to the cover panel and includes a suitable support structure for the cover fabric so that it extends when erected in an arch construction over the opening and over the panel to allow access from inside the vehicle to the upper surface of the panel in the open position thereof.

Devices of this type are particularly but not exclusively used for opening roof sections of a van or similar device in which the cover panel normally closes the van top but can be opened and pivoted out to one side to define a cantilever deck with the enclosure defining a tent section enclosing the deck and an area thereabove allowing the accessibility through the opening in the roof of the van to the deck for example as a sleeping area. The device thus serves the purpose both of lifting the roof section of the van to a height above its normal height for example for standing within the van and in addition defines ana additional area of the van which can be used generally as a sleeping area outside the normal van area but fully enclosed within the construction.

One example of a device of this general type is shown in European patent publication number 0090487 first published as an application in October 1983. The above patent showed for the first time the construction of a device of this type in which the cover panel when inverted in the open position has supported solely from the vehicle construction in cantilever manner by support hoops and cable arrangements.

This device while being a significant improvement over prior art arrangements does however have the disadvantages that it required an initial crown piece to be attached to the roof of the vehicle so as to define a straight line on the vehicle which can provide the hinge about which the cover panel moves. It will be appreciated that in most vehicles of this type there are no straight lines in the vehicle roof construction and hence the formation of a straight hinge axis which is rigidly coupled to the vehicle is difficult and requires additional pieces. In addition the provision of the additional piece and its attachment to the cover panel requires that the cover panel in the open position pivots to a low height relative to the height of the vehicle.

It is one object of the present invention therefore, to provide an improved construction of a vehicle of this general type which enables the cover panel to be coupled to the rood in a manner which avoids the direct hinged coupling thereof thus overcoming the above disadvantages.

According to the invention, therefore, there is provided a camper device comprising a body having sides, an end and a roof and having a substantially rectangular opening in the roof defined by two pairs of spaced and parallel longitudinally extending side edges, a cover panel having a closed position in which it lies on the roof covering the opening, pivot mounting means mounting the cover panel for pivotal movement about an axis along one side edge of the opening from said closed position covering the opening to an open position in which the cover panel is inverted and extends outwardly to one side of the vehicle from said one side edge, and an enclosure member including a flexible cover fabric secured by lower edges thereof to the vehicle at the opening and to the cover panel and support means for the cover fabric such that extends in an arch construction over the opening and the panel to allow access to an upper surface of the panel in the open position thereof from the opening, characterized in that said pivot mounting means includes a first pair of levers attached to said cover panel at spaced positions therealong for pivotal movement relative thereto about an axis parallel to said side edge, a second pair of levers attached to said roof at spaced positions therealong for pivotal movement relative thereto about an axis parallel to said side edge and coupling means for pivotally connection said first pair of levers to said second pair of levers for pivotal movement about an axis parallel to said one side edge whereby said pivotal movement of said cover panel is provided without the necessity of a direct hinge connection between the cover panel and the roof.

Preferably the construction includes a cable or cables which extend from the vehicle to the outer edge of the cover panel and are raised away from the pivot axis by the levers and coupling arrangement so that the cables, levers and coupling arrangement act as a cantilever construction to support the cover panel in its open position.

Preferably at the same time the weight from the cover panel is applied to the levers to hold the first and second pairs of levers apart in the open position so that the edge of the cover panel adjacent the roof is supported outwardly away from the roof without the necessity for any direct coupling or direct supporting engagement between the roof and the cover panel.

Preferably the coupling means includes a third pair of levers and a fourth pair of levers with the third pair of levers being pivotally coupled to the first pair of levers for movement about an axis on said first pair of levers at an intermediate point along the length thereof and the fourth pair of levers coupled to the second pair of levers for pivotal movement relative thereto about an axis intermediate the length of the second pair of levers, the third and fourth pair of levers being interconnected for pivotal movement about an axis intermediate the first and second pairs of levers such that the third and fourth pairs of levers hold apart said first and second pairs of levers in said open position. This arrangement can provide a particularly effective lever construction in which the outer ends of the third and fourth levers provides the support for the cables while the weight from the roof panel is transmitted through the third and fourth levers to hold the first and second levers apart thus holding the cover panel away from the roof construction. This lever arrangement also enables the cover panel to be moved to the closed position about an imaginary pivot axis between the cover panel and the roof construction without any direct contact between the cover panel and the roof construction occurring during any part of the movement.

The use of the indirect hinging arrangement defined by this invention enables a sealing between the cover panel and the roof to be significantly improved since the cover panel is free to be pulled down along four sides onto the roof construction against a suitable sealing strip without the inhibition of a rigid hinge line which would inhibit movement toward the sealing strip. In this way an improved air tight seal can be obtained between the cover member and the roof construction which is of course very important when the vehicle is moving rapidly and generating high speed air currents across the roof construction.

The use of the indirect hinging arrangement using levers enables the lengths of the levers to be selected to position the cover panel at different spacing from the side of the opening in its open position. Thus, the height of the cover panel can be varied to give for example improved over head clearance for a person standing underneath the inverted cover panel. Alternatively, the spacing of the edge of the panel from the side edge can be increased in cases where the cover panel is small, with an additional fold out flap being provided to bridge the space between the cover panel and the side edge giving an increase in the effective size of the cover panel.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
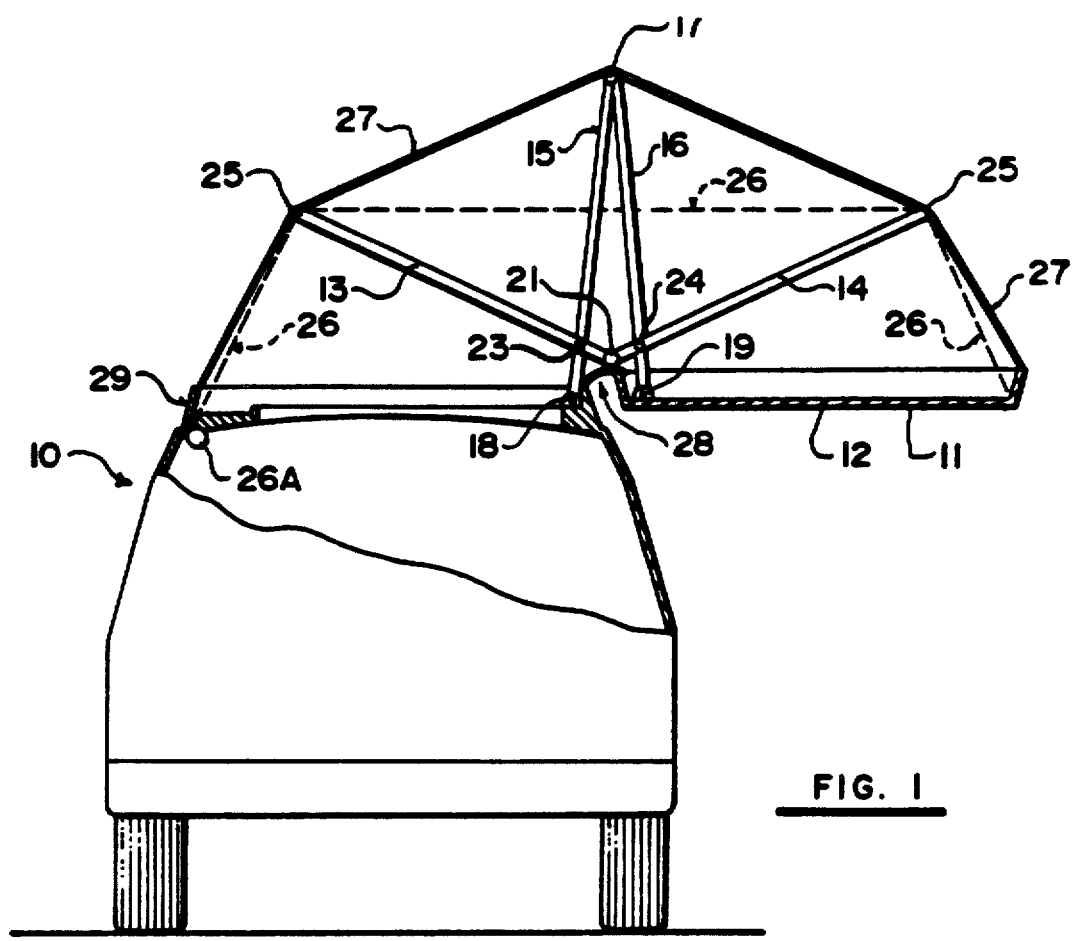
FIG. 1 is a rear elevational view of a vehicle including the pivotal cover panel according to the invention in an opened condition of the cover panel.
Figure 3:
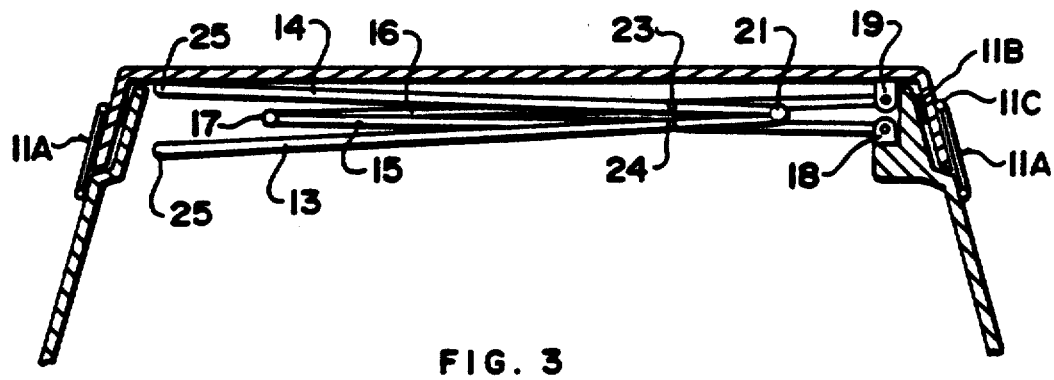
FIG. 3 is a cross-sectional view similar to FIG. 1 showing the cover panel in a closed condition.
Figure 2:
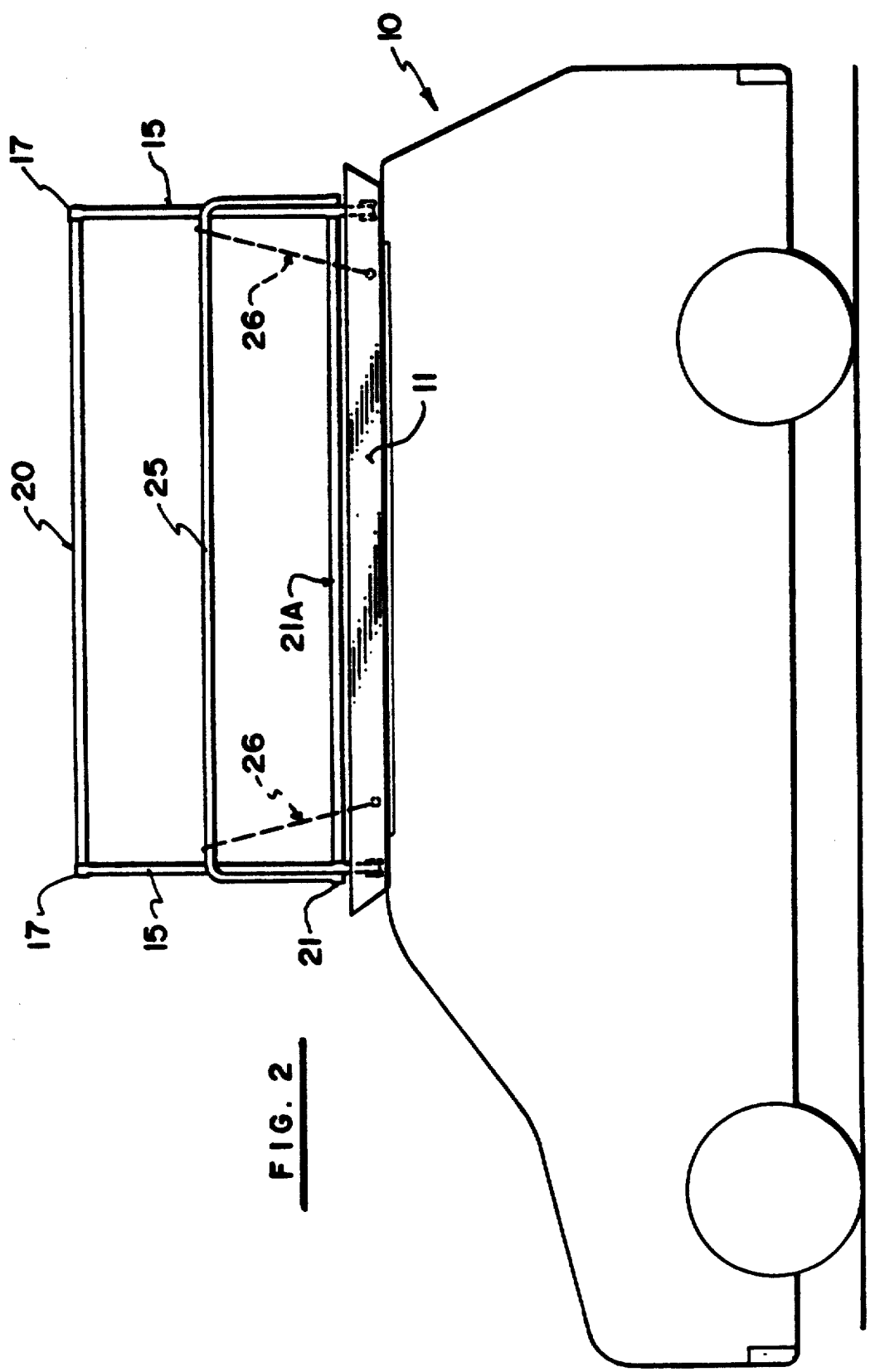
FIG. 2 is a side elevational view of the device of FIG. 1.

There is shown in FIG. 1 and FIG. 2 a vehicle 10 in the form of a van. The invention can be used with other main support structures for example trailers or camper tops of the type which can be carried on a pickup truck. A cover panel 11 is provided which in the closed condition shown in FIG. 3 overlies an opening in the roof of the vehicle 10. The opening is generally rectangular in shape having longitudinal sides and transverse ends. The cover panel thus comprises a generally flat surface 12 and flanges which incline downwardly and outwardly therefrom in the closed position to form a roof covering. On the roof of the vehicle is mounted a base frame with upstanding sides which cooperate with the flanges of the cover panel in the closed position to form a seal. To improve the sealing effect, tie-down straps can be provided shown for example externally at 11A in FIG. 3. These cooperate with sealing strips 11B provided on the outer surface of the sides 11C of the roof.

An interconnecting mechanism between the deck and the vehicle is provided by a plurality of pairs of rigid levers 13, 14 15 and 16. A first lever 15 is pivotally coupled to a second lever 16 at a coupling 17. The first lever 15 is pivotally coupled to a frame on the edge of the roof adjacent the cover panel as indicated at 18. The second lever 16 has its lower end pivotally coupled to the flat surface 12 of the deck as indicated at 19 at a position adjacent the inclined wall at the vehicle. It will be appreciated that the lever mechanisms shown at the rear of the vehicle in FIG. 1 are duplicated at the front of the vehicle thus forming pairs of the levers and that a rigid strut or struts 20 interconnects the upper ends of the levers 15, 16 across an apex of the device as shown in FIG. 2. The levers are shown schematically and in a preferred example comprise merely tubular support members of sufficient strength to accommodate the forces involved. The pivotal coupling of one lever to the next can be achieved simply by a transverse pin extending through aligned holes in the tubes as they cross. The pivot connection of an end of a lever can be formed by a clevis and a pin passing through a hole in the tube.

A third lever 13 and a fourth lever 14 have inner ends thereof pivotally connected at a coupling 21. A bar 21A extends longitudinally of the device as shown in FIG. 2 connecting the couplings. Each of the levers 13 and 14 is pivotally connected to a respective one of the levers 15 and 16 at a position intermediate the length thereof as indicated at 23 and 24 respectively. From those pivot couplings the levers extend outwardly to an outer portion as shown at which each of the levers 13 and 14 is cranked at right angles to form an elongate connecting strut 25 extending along the length of the cover panel as shown in FIG. 2.

A cable 26 has one end connected to a winch 26A carried on the roof of the vehicle at the edge of the opening remote from the cover panel in the open position thereof, passes upwardly around the strut 25 at the end of the lever 13, across from the end of the lever 13 to the end of the lever 14 and downwardly to couple with the edge of the cover panel remote from the roof of the vehicle. It will be noted from FIG. 2 that the cable 26 commences at a position on the roof inwardly of the ends of the opening and then is inclined outwardly toward the end of the strut 25 on which it is clamped or located by a suitable connector (not shown) to assist in retaining stability of the structure in a longitudinal direction.

A tent or enclosure fabric is indicated at 27 and extends from the roof of the vehicle at the edge remote from the cover panel engaging over the struts 25 and 20 down to the edge of the cover panel at the upper edge of the sidewall thereof so as to provide a tent structure standing over the deck and the opening in the roof. A fabric connecting piece 28 is also provided between the inner edge of the cover panel at the upper edge of the sidewall thereof and the adjacent edge of the roof opening. End panels are also provided of the fabric material to fully enclose the area between the deck and the open roof. The tent construction and its attachment is not shown in detail as it will be known to one skilled in the art. It may include spring hoops which hold the fabric erected and can collapse with the fabric as the cover panel is closed.

Modifications to the roof merely require a crown piece 29 defined by upstanding and inwardly inclined sidewalls which match the sidewalls of the cover panel in the closed position. In addition a transverse reinforcing strut arranged at the front and the rear of the roof opening is necessary.

Figure 4:
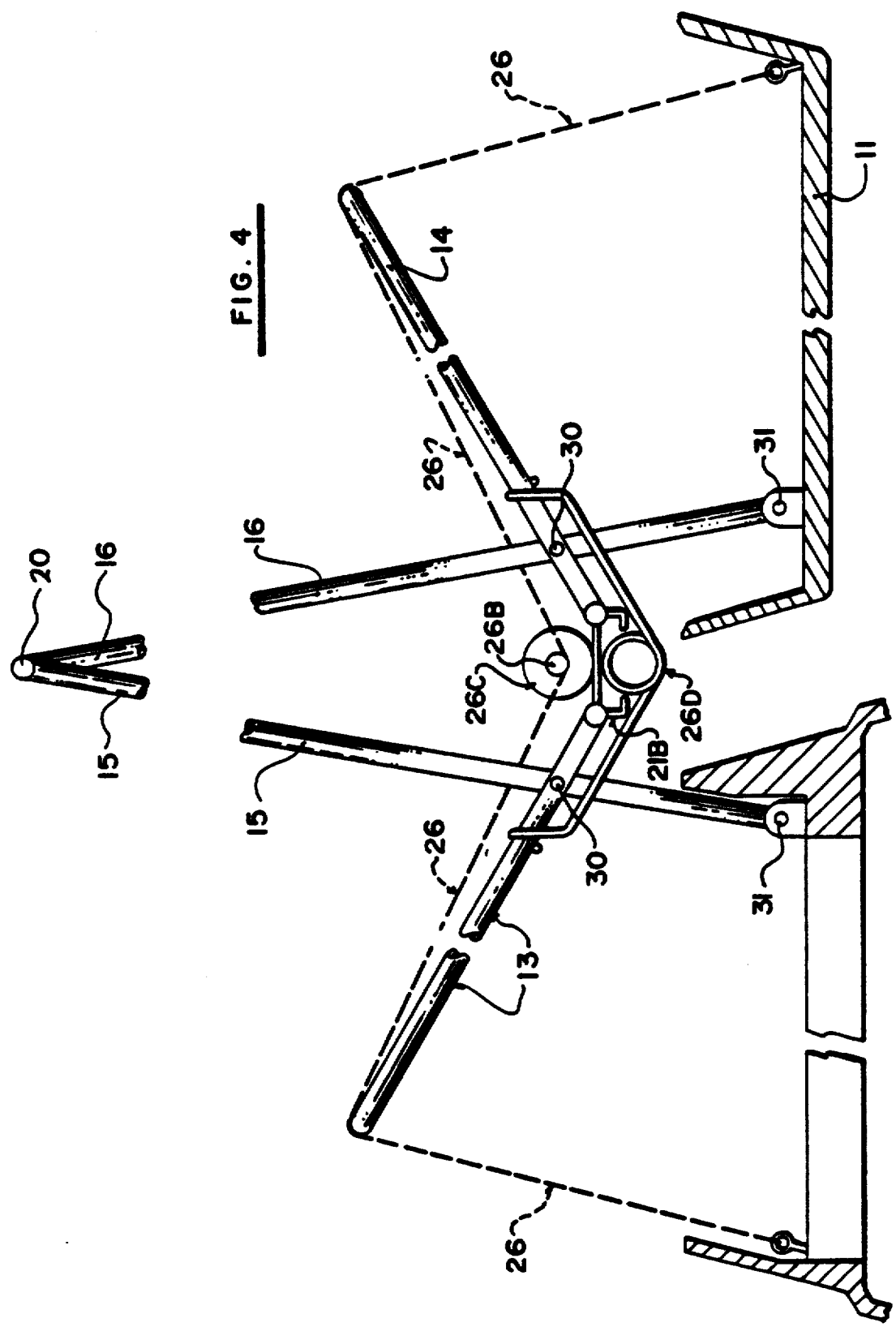
FIG. 4 is a rear elevational view similar to FIG. 1 on an enlarged scale showing an alternative arrangement.

Turning now to FIG. 4, there is shown on an enlarged scale a view similar to FIG. 1 in which the device is slightly modified by the positioning of the winch at a central position rather than at the end of the cable.

In this arrangement the levers 13, 14, 15 and 16 are substantially as previously described. The transverse pins interconnecting the tubes forming the levers are indicated at 30 and the clevis on which the lower end of the levers is mounted is indicated at 31.

The transverse bar 21A is formed as an inverted channel member 21B to which the ends of the levers 13 and 14 are coupled. On the upper side of the bar 21B is mounted a shaft 26B onto which the cable 26 can be wrapped. In the position shown in FIG. 4 the cable is substantially fully unwrapped and hence the cover panel 11 is in the open position. When the shaft 26B is rotated by way of a winch motor 26C, the cable is wound up so as to draw the cable inwardly onto the shaft and pull the cover panel gradually into the closed position illustrated in FIG. 3. A coil spring 26D is positioned underneath the bar 21B and has legs which cooperate with the levers 13 and 14 respectively so as to maintain a bias against those levers into the open position thus enabling the cover panel to move to the open position as the cable is released by rotating the winch motor 26C. The levers 13 and 14 should in the open position have an angle greater than 90° so that the weight applied upon the ends of the levers 13 and 14 by the cable 26 from the cover panel acts to hold the levers in the wide open position forcing the connections between the levers 15 and 16 apart to a maximum position determined by the full length of the cable 26. Thus the bar 21B is forced upwardly and the levers 15 and 16 forced outwardly to maintain the edge of the cover panel away from the edge of the roof both in the open position and as the cover panel gradually closes. In order for the winch shaft 26B to act upon the cable to draw in the device into the closed position, the shaft 26B must be positioned above the coupling the levers 13 and 14 and the bar 21B so that the levers can be drawn inwardly and the bar forced downwardly by rotation of the shaft 26B.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A camper vehicle comprising a body having sides, an end and a roof structure and having an opening in the roof structure, a cover panel having a closed position in which it extends across the roof structure covering the opening, pivot mounting means mounting the cover panel for pivotal movement relative to the roof structure from said closed position covering the opening to an open position in which the cover panel is inverted and extends outwardly to one side of the roof structure, and an enclosure member including a flexible cover fabric secured by lower edges thereof to the vehicle and to the cover panel and support means for the cover fabric such that the cover fabric extends in an arch construction over the opening and the panel to allow access to the upper surface of the panel in the open position thereof from the opening, said pivot mounting means including a first and a second support structure spaced apart along one side of the panel, each of said support structures comprising a first lever having one end pivotally connected to said panel, a second lever having one end pivotally connected to said roof structure, pivot coupling means connecting said first and second levers for pivotal movement relative to one another about an axis spaced from said roof structure and said cover panel, a third lever pivotally coupled to one of the first and second levers at a point along the length of said one of said first and second levers which is intermediate said one end of said one of said first and second levers and said pivot coupling means and at a point on the third lever intermediate an inner point and an outer point thereon, and flexible connecting means extending from said panel at a position thereon spaced outwardly of said one end of the first lever to said outer point of the third lever such that the levers and flexible connecting means support the cover panel in cantilever arrangement from said roof structure in the open position thereof and means on said third lever at said inner point thereof arranged such that force applied to the outer point of the third lever by the weight of said panel caused the first and second levers to be forced apart.

2. The invention according to claim 1 wherein the means at the inner point of the third lever comprises a fourth lever pivotally coupled to the other of the first and second levers at a point along the length of the other of the first and second levers intermediate said one end and said pivot coupling means and at a point on the fourth lever intermediate an inner point and an outer point thereon, the third and fourth levers being interconnected at said inner points thereof for pivotal movement each relative to the other about an axis which is intermediate the first and second levers and positioned such that the outer points of the third and fourth levers fold in a direction towards said pivot coupling means.

3. The invention according to claim 2 including an elongate structural member extending from said inner points of said third and fourth levers of the first support structure to said inner points of said third and fourth levers of the second support structure.

4. The invention according to claim 2 including spring means biasing said third and fourth levers so as to increase an angle therebetween thus biasing the cover panel to the open position.

5. The invention according to claim 4 including winch means for withdrawing the flexible connecting means so as to move said cover panel to the closed position against said spring bias.

6. A camper vehicle comprising a body having sides, an end and a roof structure and having an opening in the roof structure, a cover panel having a closed position in which it extends across the roof structure covering the opening, pivot mounting means mounting the cover panel for pivotal movement relative to the roof structure from said closed position covering the opening to an open position in which the cover panel is inverted and extends outwardly to one side of the roof structure, and an enclosure member including a flexible cover fabric secured by lower edges thereof to the vehicle and to the cover panel and support means for the cover fabric such that the cover fabric extends in an arch construction over the opening and the panel to allow access to the upper surface of the panel in the open position thereof from the opening, said pivot mounting means including a first and a second support structure spaced apart along one side of the panel, each of said support structures comprising a first lever having one end pivotally connected to said panel, a second lever having one end pivotally connected to said roof structure, pivot coupling means connecting said first and second levers for pivotal movement relative to one another about an axis spaced from said roof structure and said cover panel, a third lever pivotally coupled to the first lever at a point along the length of said first lever which is intermediate said one end of said first lever and said pivot coupling means and at a point on the third lever intermediate an inner point and an outer point thereon, a fourth lever pivotally coupled to the second lever at a point along the length of the second lever intermediate said one end of said second lever and said pivot coupling means and at a point on the fourth lever intermediate an inner point and an outer point thereon, the third and fourth levers being interconnected at said inner points thereof for pivotal movement each relative to the other about an axis which is intermediate the first and second levers and positioned such that the outer points of the third and fourth levers fold in a direction towards said pivot coupling means and flexible connecting means having a portion extending from said panel at a position thereon spaced outwardly of said one end of the first lever to said outer point of the third lever and a portion extending from the roof structure to said outer point of the fourth lever such that the levers and flexible connection means support the cover panel in cantilever arrangement from said roof structure in the open position thereof.

7. A camper vehicle comprising a body having sides, an end and a roof structure and having an opening in the roof structure, a cover panel having a closed position in which it extends across the roof structure covering the opening, pivot mounting means mounting the cover panel for pivotal movement relative to the roof structure from said closed position covering the opening to an open position in which the cover panel is inverted and extends outwardly to one side of the roof structure, and an enclosure member including a flexible cover fabric secured by lower edges thereof to the vehicle and to the cover panel and support means for the cover fabric such that the cover fabric extends in an arch construction over the opening and the panel to allow access to the upper surface of the panel in the open position thereof from the opening, said pivot mounting means including a first and a second support structure spaced apart along one side of the panel, each of said support structures comprising a first lever having one end pivotally connected to said panel, a second lever having one end pivotally connected to said roof structure, pivot coupling means connecting said first and second levers for pivotal movement relative to one another about an axis spaced from said roof structure and said cover panel, means interconnecting said first and second levers at a point along the length of each of the first and second levers which is intermediate said one end of each of said first and second levers and said pivot coupling means and means for communicating force from said panel to said interconnecting means to cause said first and second levers to be forced apart.

8. The invention according to claim 7 wherein said communicating means is responsive to movement of said panel to release said force.

9. The invention according to claim 7 wherein the pivot coupling means couples said first and second levers for pivotal movement about a common pivot axis.

10. The invention according to claim 7 wherein said interconnecting means comprises a third lever pivotally connected to one of the first and second levers at a point on the third lever intermediate an inner point and an outer point thereon, said communicating means being arranged to communicate force from said panel to said outer point.

11. The invention according to claim 10 wherein said communicating means comprises a flexible elongate element extending from said panel at a position thereon spaced outwardly of said one end of the first lever to said outer point of the third lever such that the levers and flexible elongate element support the cover panel in cantilever arrangement from said roof structure in the open position thereof.

12. The invention according to claim 10 including a fourth lever connected to said third lever at the inner point thereof and pivotally coupled to the other of the first and second levers intermediate said one end and said pivot coupling means and at a point on the fourth lever intermediate an inner point and an outer point thereon, the third and fourth levers being interconnected at said inner points thereof for pivotal movement each relative to the other about an axis which is intermediate the first and second levers and positioned such that, as the cover panel moves toward said closed position, the outer points of the third and fourth levers fold in a direction toward said pivot coupling means.

13. The invention according to claim 12 including an elongate structural member extending from said inner points of said third and fourth levers of the first support structure to said inner points of said third and fourth levers of the second support structure.

* * * * *